US012664496B2

(12) United States Patent
Mickey

(10) Patent No.: US 12,664,496 B2
(45) Date of Patent: Jun. 23, 2026

(54) SYSTEM AND METHOD FOR RESOURCE ALLOCATION CONTROL WITH DISPLAY

(71) Applicant: HARTFORD FIRE INSURANCE COMPANY, Hartford, CT (US)

(72) Inventor: Alan S. Mickey, Coventry, CT (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 204 days.

(21) Appl. No.: 18/333,980

(22) Filed: Jun. 13, 2023

(65) Prior Publication Data

US 2024/0420052 A1 Dec. 19, 2024

(51) Int. Cl.
*G06Q 10/06* (2023.01)
*G06Q 10/0631* (2023.01)
*G06F 3/0482* (2013.01)

(52) U.S. Cl.
CPC ..... *G06Q 10/06316* (2013.01); *G06F 3/0482* (2013.01)

(58) Field of Classification Search
CPC ........................ G06Q 10/06316; G06F 3/0482
See application file for complete search history.

(56) References Cited

U.S. PATENT DOCUMENTS

| | | | | |
|---|---|---|---|---|
| 8,250,576 | B2 * | 8/2012 | Yildiz ................... | G06F 9/4812 |
| | | | | 717/124 |
| 8,407,078 | B1 | 3/2013 | Caputo et al. | |
| 10,762,471 | B1 * | 9/2020 | Wang ................... | G06F 16/275 |

| | | | | |
|---|---|---|---|---|
| 2008/0052146 | A1 | 2/2008 | Messinger et al. | |
| 2014/0067428 | A1 * | 3/2014 | Snyder ................... | G06Q 40/08 |
| | | | | 705/4 |
| 2014/0122161 | A1 | 5/2014 | Gupta et al. | |
| 2019/0340565 | A1 * | 11/2019 | Chandrasekharan ........................ | |
| | | | | G06F 9/4881 |
| 2020/0394583 | A1 * | 12/2020 | Sangekar ......... | G06Q 10/06316 |
| 2021/0049530 | A1 * | 2/2021 | Anderson ........ | G06Q 10/06312 |
| 2021/0342785 | A1 * | 11/2021 | Mann ............... | G06Q 10/06316 |
| 2022/0197306 | A1 * | 6/2022 | Cella ............... | G06Q 10/06311 |

(Continued)

FOREIGN PATENT DOCUMENTS

WO WO20230256545 * 9/2022

OTHER PUBLICATIONS

Hashemi-Petroodi, S. Ehsan, et al. "Model-dependent task assignment in multi-manned mixed-model assembly lines with walking workers." Omega 113 (2022): 102688. (Year: 2022).*

(Continued)

*Primary Examiner* — Hamzeh Obaid
(74) *Attorney, Agent, or Firm* — Buckley, Maschoff & Talwalkar LLC

(57) ABSTRACT

According to some embodiments, systems and methods are provided including instructions to: receive a workflow; retrieve a plurality of tasks associated with the received workflow; generate a timeline for execution of each task including for at least one task a lead time and a dependent task; receive a user assignment for each task; and transmit the timeline and the user assignment to a workflow scheduler and the assigned user. A communication port is coupled to the back-end application computer server to facilitate an exchange of data with a remote device to support interactive user interface displays that provide information about the timeline. Numerous other aspects are provided.

17 Claims, 15 Drawing Sheets

(56) References Cited

U.S. PATENT DOCUMENTS

2023/0252572 A1 * 8/2023 Roy ........................ G06F 16/14
                                                      705/4
2023/0351515 A1 * 11/2023 Lane ...................... G06Q 40/06

OTHER PUBLICATIONS

K. Pacher, Mathias, and Uwe Brinkschulte. "Real-time distribution of time-dependant tasks in heterogeneous environments." 2010 13th IEEE International Symposium on Object/Component/Service-Oriented Real-Time Distributed Computing Workshops. IEEE, 2010. (Year: 2010).*

* cited by examiner

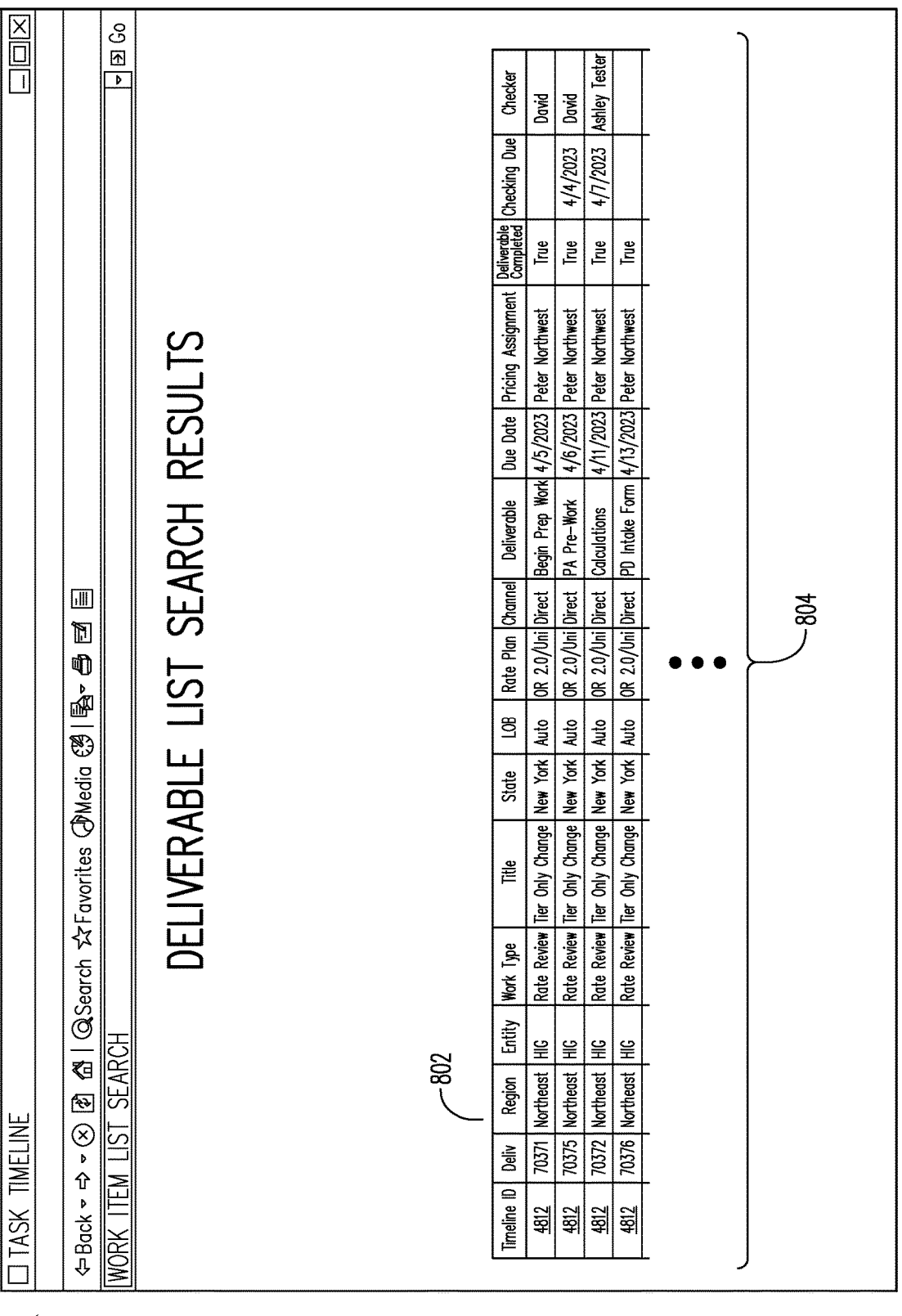

| Timeline ID | Deliv | Region | Entity | Work Type | Title | State | LOB | Rate Plan | Channel | Deliverable | Due Date | Pricing Assignment | Deliverable Completed | Checking Due | Checker |
|---|---|---|---|---|---|---|---|---|---|---|---|---|---|---|---|
| 4812 | 70371 | Northeast | HIG | Rate Review | Tier Only Change | New York | Auto | OR 2.0/Uni | Direct | Begin Prep Work | 4/5/2023 | Peter Northwest | True | | David |
| 4812 | 70375 | Northeast | HIG | Rate Review | Tier Only Change | New York | Auto | OR 2.0/Uni | Direct | PA Pre-Work | 4/6/2023 | Peter Northwest | True | 4/4/2023 | David |
| 4812 | 70372 | Northeast | HIG | Rate Review | Tier Only Change | New York | Auto | OR 2.0/Uni | Direct | Calculations | 4/11/2023 | Peter Northwest | True | 4/7/2023 | Ashley Tester |
| 4812 | 70376 | Northeast | HIG | Rate Review | Tier Only Change | New York | Auto | OR 2.0/Uni | Direct | PD Intake Form | 4/13/2023 | Peter Northwest | True | | |

DELIVERABLE LIST SEARCH RESULTS

*FIG. 8*

| TASK ID | TASK NAME | LEAD TIME | DEPENDENCIES | | EFFORT HOURS |
|---------|-----------|-----------|--------------|---|--------------|
| 1302 | 1304 | 1306 | 1308 | | 1310 |
| E_10001 | BEGIN PREP WORK | -3 | PA PRE-WORK | | 8.0 |
| E_10002 | PA PRE-WORK | -10 | INDICATIONS | | 7.5 |
| E_1000N | GO NOGO | 10 | FINAL IT PACK | | 8.0 |

1300

SYSTEM AND METHOD FOR RESOURCE ALLOCATION CONTROL WITH DISPLAY

TECHNICAL FIELD

The present application generally relates to computer systems and more particularly to computer systems that are adapted to accurately, securely, and/or automatically manage a workflow.

BACKGROUND

Organizations make use of workflows to provide a visualization of a flow of data in executing a series of tasks, with the goal of executing an organizational process. A workflow is a set of steps or tasks to complete a specific process or job within an organization. The workflow may define the sequence of tasks, who is responsible for each task, and what tools or resources are required to complete the task. A given workflow may be complex and include multiple tasks. Additionally, the given workflow may include different tasks depending on other parameters (e.g., location of the workflow). A timeline for completion of the tasks is conventionally based on the amount of time required to complete each task. In some instances, the tasks may be chained together to complete the organizational process, whereby data created during execution of one of the tasks may be used by a next task. The dependency between tasks may affect the scheduling of resources to complete each of the tasks. It may be challenging for an organization to implement the organizational process and allocate appropriate resources in view of different task parameters and dependencies.

It would be desirable to provide improved systems and methods to accurately and automatically provide a timeline for a workflow. Moreover, the timeline should be easy to access, understand, interpret, update, etc.

SUMMARY OF THE INVENTION

According to some embodiments, systems, methods, apparatus, computer program code and means are provided to generate a timeline for executing tasks of a workflow.

Some embodiments are directed to a system implemented via a back-end application computer server of an enterprise. The system comprises a task data store a back-end application computer server and a communication port. The task data store contains a plurality of tasks as part of a workflow. The back-end application computer server is coupled to the task data store, and includes a computer processor; a computer memory coupled to the computer processor and storing instructions. The instructions, when executed by the computer processor, cause the back-end application computer server to: receive a workflow; retrieve a plurality of tasks associated with the received workflow; generate a timeline for execution of each of each task including for at least one task a lead time and a dependent task; receive a user assignment for each task; and transmit the timeline and the user assignment to a workflow scheduler and the assigned user. The communication port is coupled to the back-end application computer server to facilitate an exchange of data with a remote device to support interactive user interface displays that provide information about the timeline.

Some embodiments are directed to a method implemented via a back-end application computer server of an enterprise. The method comprises receiving a workflow; retrieving a plurality of tasks associated with the received workflow; generating a timeline for execution of each of each task, including for at least one task a lead time and a dependent task; receiving a user assignment for each task; and transmitting the timeline and the user assignment to a workflow scheduler and the assigned user.

Other embodiments are directed to a non-transitory, computer-readable medium storing instructions that, when executed by a processor, cause the processor to perform a method implemented via a back-end application computer server of an enterprise. The method comprises receiving a workflow; retrieving a plurality of tasks associated with the received task; generating a timeline for execution of each of each task, including for at least one task a lead time and a dependent task; receiving a user assignment for each task; and transmitting the timeline and the user assignment to a workflow scheduler and the assigned user.

A technical effect of some embodiments of the invention is the improved and computerized workflow timeline generator for an organization that provides fast, secure and useful results. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIG. 8 is an outward view of deliverable list search results on a graphical user interface according to some embodiments.

Figure 1:
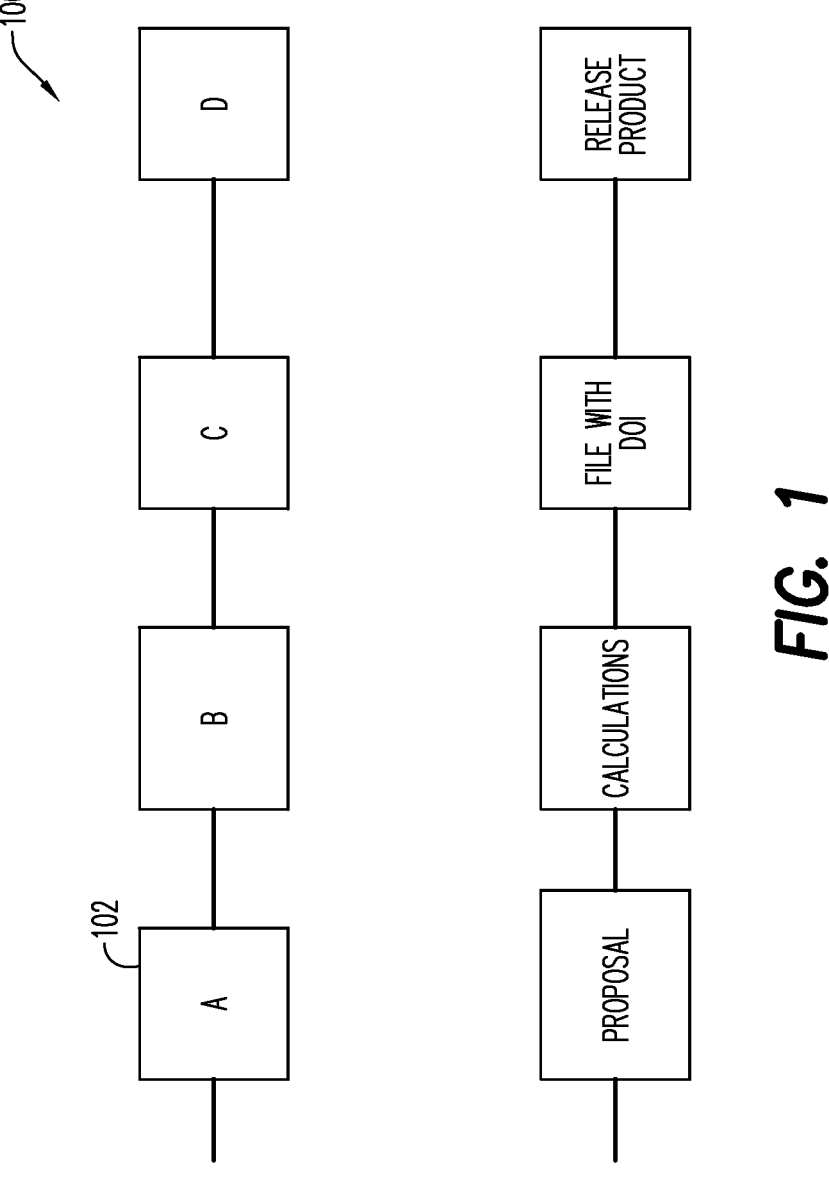
FIG. 1 shows a workflow according to some embodiments.

Throughout the drawings and the detailed description, unless otherwise described, the same drawing reference numerals will be understood to refer to the same elements, features and structures. The relative size and depiction of these elements may be exaggerated or adjusted for clarity, illustration, and/or convenience.

DETAILED DESCRIPTION

The following description is provided to enable any person in the art to make and use the described embodiments and sets forth the best mode contemplated for carrying out some embodiments. Various modifications, however, will remain readily apparent to those in the art.

One or more embodiments or elements thereof can be implemented in the form of a computer program product including a non-transitory computer readable storage medium with computer usable program code for performing the method steps indicated herein. Furthermore, one or more embodiments or elements thereof can be implemented in the form of a system (or apparatus) including a memory, and at least one processor that is coupled to the memory and operative to perform exemplary method steps. Yet further, in another aspect, one or more embodiments or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

The present invention provides significant technical improvements to facilitate data processing associated with generating a timeline for a workflow. The present invention is directed to more than merely a computer implementation of a routine or conventional activity previously known in the industry as it provides a specific advancement in the area of electronic record analysis by providing improvements in the operation of a computer system that customizes a timeline for tasks that make up a workflow. Non-exhaustive examples of the workflow may be a rate review for a risk organization and introduction of a new product or version of a product. The present invention provides improvement beyond a mere generic computer implementation as it involves the novel ordered combination of system elements and processes to provide improvements in the speed, security, and accuracy of such a timeline tool for an enterprise. Some embodiments of the present invention are directed to a system adapted to automatically customize and execute generation of a timeline for a workflow, modify the timeline, identify capacity requirements and availability, identify unassigned tasks, automatically prompt a next step, track quality, aggregate data from multiple data sources, automatically optimize equipment information to reduce unnecessary messages or communications, etc. (e.g., to consolidate task data). Moreover, communication links and messages may be automatically established, aggregated, formatted, modified, removed, exchanged, etc. to improve network performance (e.g., by reducing an amount of network messaging bandwidth and/or storage required to create workflow messages or alerts, improve security, reduce the size of a workflow data store, more efficiently collect data, etc.).

Embodiments provide a timeline workflow generator system ("timeline tool") to configure a timeline for different tasks in a workflow based on one or more parameters (e.g., task and location rules (e.g., requirements/regulations), etc.). As used herein, a timeline may be a sequential order for completion of particular tasks (e.g., tasks of a workflow); it may be a detailed schedule including all of the ordered tasks involved and a deadline for each. The role of the timeline is to prioritize/order the tasks of the workflow according to a variety of criteria including, but not limited to, dependency between tasks and time requirements. Conventionally, timeline construction was based on an amount of hours planned for a particular task. In this conventional process, in a case Task B is dependent on Task A, Task B may not be scheduled to start until the planned hours for Task A have passed. However, there are instances whereby Task B may be started before Task A is completed, even though Task B is dependent on Task A. Pursuant to one or more embodiments, the timeline tool may determine and apply a lead time in the generation of the timeline. Lead Time may refer to an overlap between a first and second activity (e.g., when an activity is still running and at the same time the execution of another activity begins, the Lead Time indicates the overlap between the first and the second activity.) As a non-exhaustive example, Task A will take 4 days and Task B will take 5 days, for a total of 9 days of work. Task B is dependent on Task A. In a case Task B has two days of Lead Time, work can be started on Task B two days earlier than the conclusion of the previous activity (Task A). In this way, the total duration of the processing will be 7 days instead of 9. The inventors note that for this reason, identifying Lead Times may help generate timelines so that an organization may make the most of that time. The early start of subsequent activities reduces the overall time required to complete a sequence of activities. It is noted that in planning activities, lead time is generally indicated as negative because it is considered as the time that is being saved compared to a finish-to-start planning.

Lag Time may also be used by the timeline tool to generate the timeline. In contrast to Lead Time, Lag Time is the amount of time whereby a subsequent activity is required to be delayed with respect to a predecessor activity. For example, when Task A has been completed, but there was a delay with the start of Task B, the delay itself may be referred to as a Lag Time.

Pursuant to some embodiments, the timeline may be forwarded to a resource allocation scheduler ("scheduler") to identify resource availability to determine whether appropriate resources are available to execute each task. The data from the timeline tool may flow into the scheduler, providing for the generation of demand and capacity reporting, as described further below. In some embodiments, the scheduler may send feedback to the timeline generator indicating enough resources are not available (which may be considered a task modification), and the timeline tool may adjust dates and lead times, in some instances, in the timeline. A "resource" may be a machine/process/user necessary to complete a task or subtask. Using the parameters defined for different workflows and different locations, the timeline tool may capture data received from one or more parties and generate an execution time for each task in the workflow. The tool may use historical data and a machine learning model/artificial intelligence to generate the timeline. For example, past task completion data and other data-obtained from sources like log files, timesheets, activity files and records of previously performed tasks and the time associated with performing these tasks—may be used to generate a timeline via a timeline model algorithm. Feedback on how close the time for actual completion of the task is to the generated timeline may be added as historical data to a machine learning model to feed forward into new and future timelines.

Embodiments may also provide for the timeline tool to generate timeline templates based on some general information, and the templates may then be further customized by a user. After configuration, the timeline may indicate any upcoming reviews that have not yet been assigned, allowing a manager to assign them.

In addition to forwarding the timeline to the scheduler, the timeline tool may, according to some embodiments, be linked to a Filing requirement system for a state/LOB and/or a rate planning system that provides the rate planned for a specific review.

Herein, a non-exhaustive example of a workflow is a rate review for a risk organization. A rate review may be a process whereby a risk organization explains how they determine the amount they charge for a product (e.g., for a risk product). According to some embodiments, the product may be made available to parties in different locations (e.g., regions or states of the United States). Each location may have different procedures and requirements for a product to meet before the product may be available for parties in that respective region or state. For example, the Department of Insurance (DOI) (or appropriate regulator) of Iowa may have a "file and use 30 day" policy whereby the product may be released after filing the product plan with the DOI within a specified time period (in this case, 30 days), while West Virginia may have a 60 day prior approval policy whereby the product may be released 60 days after the product plan has been approved. As another example, the DOI for some states may require a particular task for a workflow, while the DOI for other states does not require that particular task.

FIG. 1 shows a workflow 100 according to some embodiments. In particular, an organization, such as an insurance company, may have a risk relationship product(s) (e.g., insurance policies for home and/or automobile) that they would like to make available (e.g., release) to parties (either directly with the parties or through entities such as employers). The product may be a new product, an update of a product (e.g., modifying an existing feature), or an extension (e.g., adding a feature) of the product and may include a rate (a new one in the product extension, for example). The organization may have one or more particular tasks 102 (e.g., A-D) that may be executed to for the rate review process. Together the sequence of tasks may be part of a workflow 100, such that the workflow 100 comprises and is defined by a series of steps/tasks 102 that are completed to obtain/complete an objective (e.g., completing a rate review). Continuing with the non-exhaustive example, the tasks may include a proposal (task "A"), calculations (task "B"), filing a product plan including the rate with a regulatory agency (e.g., DOI) (task "C"), and releasing the product (task "D"). It is noted that the product plan may contain the product rates and rules.

Figure 2:
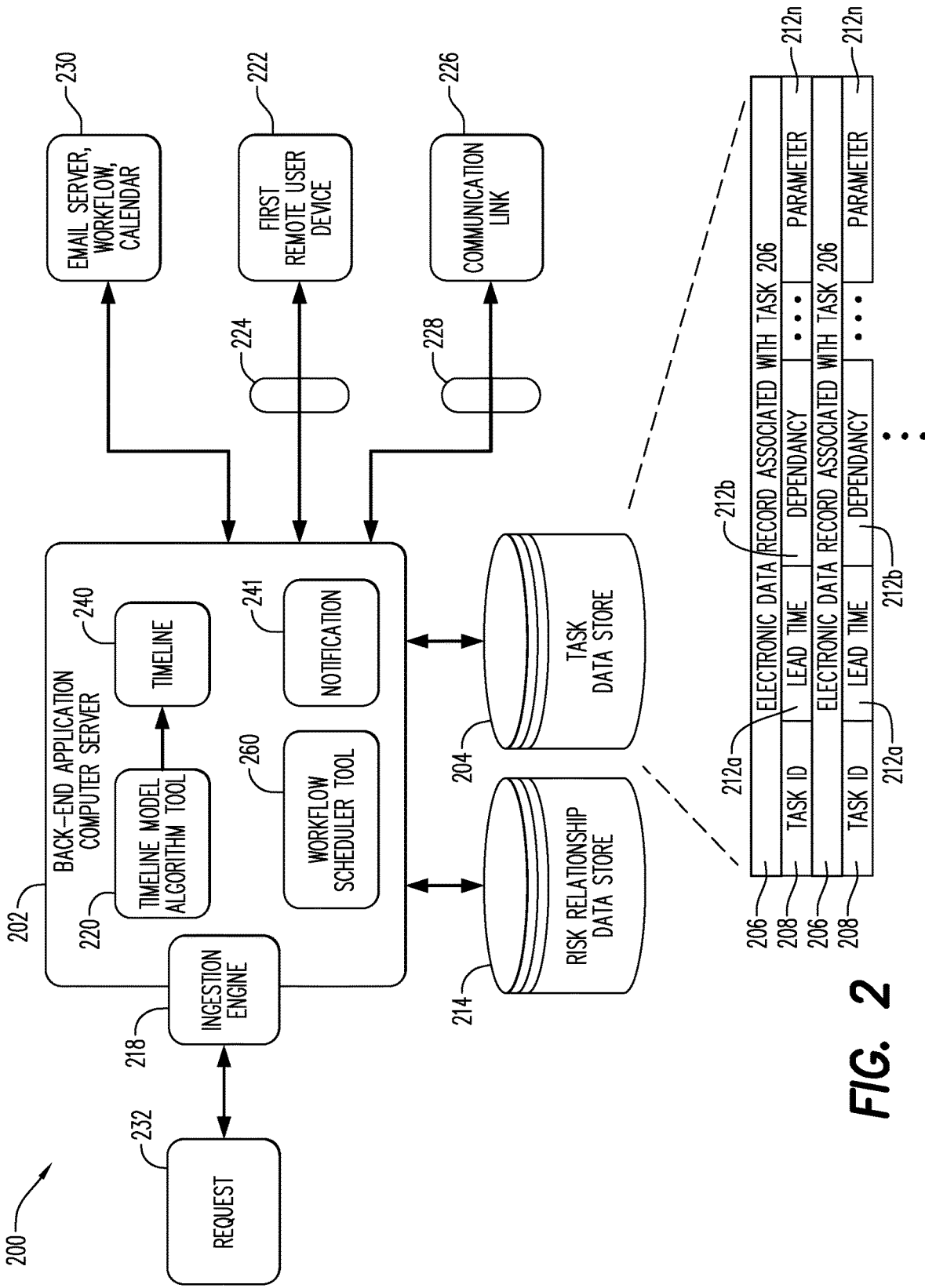
FIG. 2 is a block diagram of a system architecture according to some embodiments.

FIG. 2 is a high-level block diagram of a timeline management system 200 that may be provided according to some embodiments of the present invention. In particular, the system 200 includes a back-end application computer server 202 that may access information in a task data store 204 (e.g., storing a set of electronic records associated with tasks included in various workflows 100, each record 206 including, for example, one or more task identifiers 208, lead time 212a, dependencies 212b, other task parameters 212n including inputs for each task, outputs for each task, etc.). The task parameters may be non-exhaustive examples of the "task rules". Pursuant to some embodiments, the task rules may be input by a user and/or populated based on historical records and machine learning. The back-end application computer server 202 may also store information into other data stores, such as a risk relationship data store 214, and utilize an ingestion engine 218 and timeline model algorithm 220 to exchange and process messages (e.g., daily/weekly data sweeps or on-demand changes) and view, analyze, and/or update the electronic records. The back-end application computer server 202 may also exchange information with a remote user device 222 (e.g., via a firewall 224). The back-end application computer server 202 may also exchange information via communication links 226 (e.g., via communication port 228 that may include a firewall) to communicate with different systems. The back-end application computer server 202 may also transmit information directly to an email server, workflow application, and/or calendar application 230 to facilitate automated communications and/or other actions. According to some embodiments, an interactive graphical user interface platform of the back-end application computer server 202 may facilitate resource management, schedule recommendations, alerts, and/or the display of results via one or more remote administrator computers (e.g., to display the timeline) and/or the remote user device 222. For example, the remote user device 222 may transmit annotated and/or updated information regarding a task status to the back-end application computer server 202. Based on the updated information, the back-end application computer server 202 may adjust data in the task data store 204, and the change may (or may not) be used in connection with other systems. Note that the back-end application computer server 202 and/or any of the other devices and methods described herein might be associated with a third party, such as a vendor that performs a service for an organization.

The back-end application computer server 202 and/or the other elements of the system 200 may be, for example, associated with a Personal Computer ("PC"), laptop computer, smartphone, an organization server, a server farm, and/or a database or similar storage devices. According to some embodiments, an "automated" back-end application computer server 202 (and/or other elements of the system 200) may facilitate the automated access and/or update of electronic records in the data stores 204, 214 and/or the management of resources. As used herein, the term "automated" may refer to, for example, actions that can be performed with little (or no) intervention by a human.

Devices, including those associated with the back-end application computer server 202 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The back-end application computer server 202 may store information into and/or retrieve information from the task data store 204, and/or the risk relationship data store 214. The data stores 204, 214 may be locally stored or reside remote from the back-end application computer server 202. As will be described further below, the task data store 204 may be used by the back-end application computer server 202 in connection with an interactive user interface to access and update electronic records. Although a single back-end application computer server 202 is shown in FIG. 2, any number of such devices may be included. Moreover, various devices described herein might be combined according to embodiments of the present invention. For example, in some embodiments, the back-end application computer server 202 and timeline data store 104 may be co-located and/or may comprise a single apparatus.

The elements of the system 200 may work together to perform the various embodiments of the present invention. Note that the system 200 of FIG. 2 is provided only as an example, and embodiments may be associated with additional elements or components. According to some embodiments, the elements of the system 200 automatically transmit information associated with an interactive user interface display over a distributed communication network. User interfaces 400, 500, 600, 700, 800, 900, 1000, 1410, etc. may be presented on any type of display apparatus (e.g., desktop monitor, smartphone display, tablet display) provided by any type of client device (e.g., desktop system, smartphone, tablet computer). The application, which is executed to provide user interface 400, 500, 600, 700, 800, 900, 1000, 1410, etc., may comprise a Web Browser, a standalone application, or any other application. Embodiments are not limited to user interface 400, 500, 600, 700, 800, 900, 1000, 1410, etc.

Figure 3:
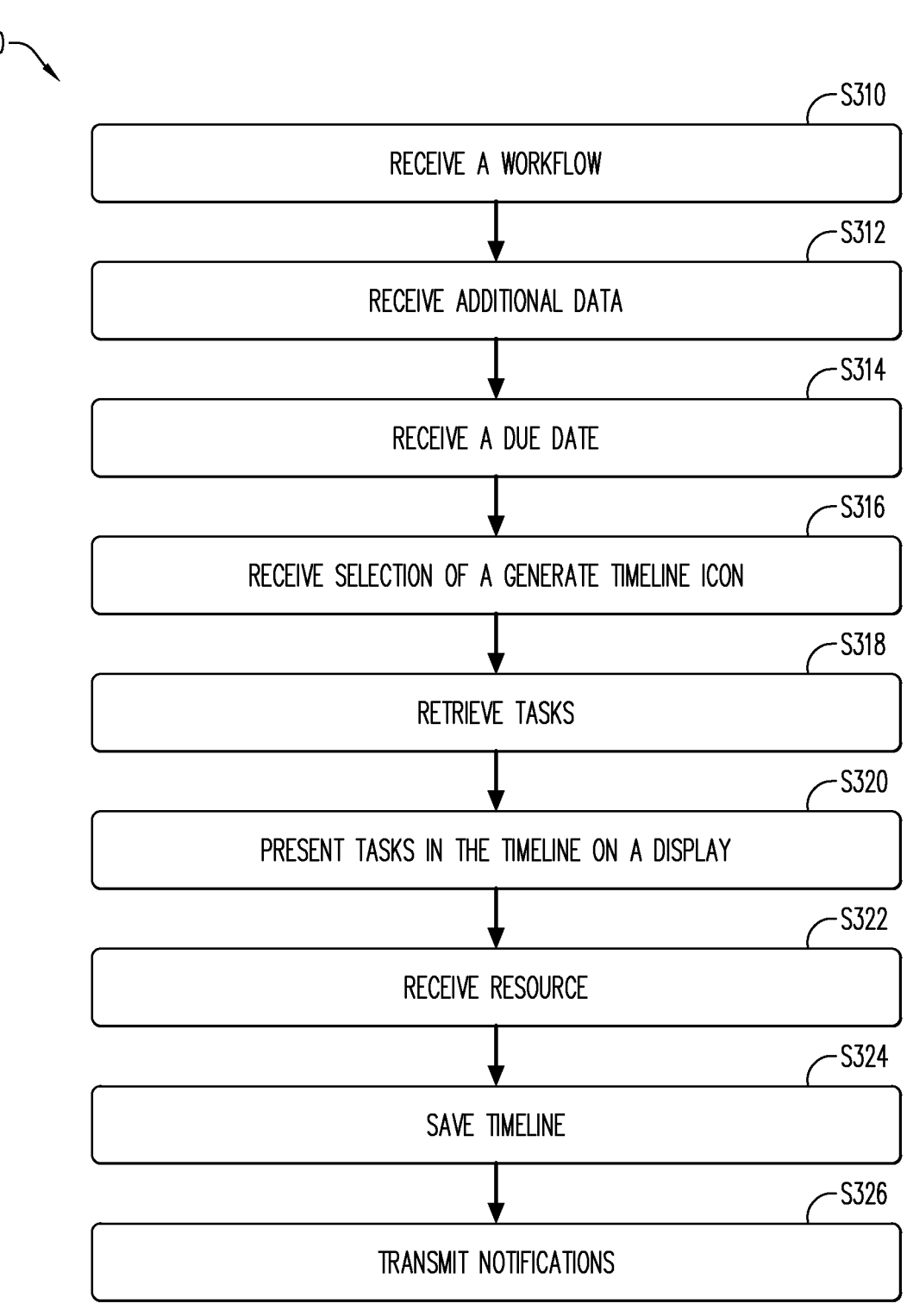
FIG. 3 is a flow diagram according to some embodiments.

FIG. 3 illustrates a method 300 that might be performed by some or all of the elements of the system 200 described with respect to FIG. 2, or any other system, according to some embodiments of the present invention. In one or more embodiments, the back-end application computer server 202 may be conditioned to perform the process 300 and any other processes described herein, such that a processor 1110 (FIG. 11) of the server 202/system 200 is a special purpose element configured to perform operations not performable by a general-purpose computer or device. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein. The instructions may be embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Prior to the method 300, the task data store 204 is created. As described above, the task data store 204 stores a set of electronic records associated with tasks included in various workflows. Each record includes, but is not limited to, a task identifier 208, and a plurality of parameters 212. The parameters may include a task name, a lead time 212*a*, dependency 212*b*, effort hours, and other suitable task parameters. Pursuant to some embodiments, the lead time may be based on the dependency. For example, in one scenario task A has a lead time of four days when task B is dependent on task A, and in another scenario task A has a lead time of two days when task C is dependent on task A.

Figure 4:
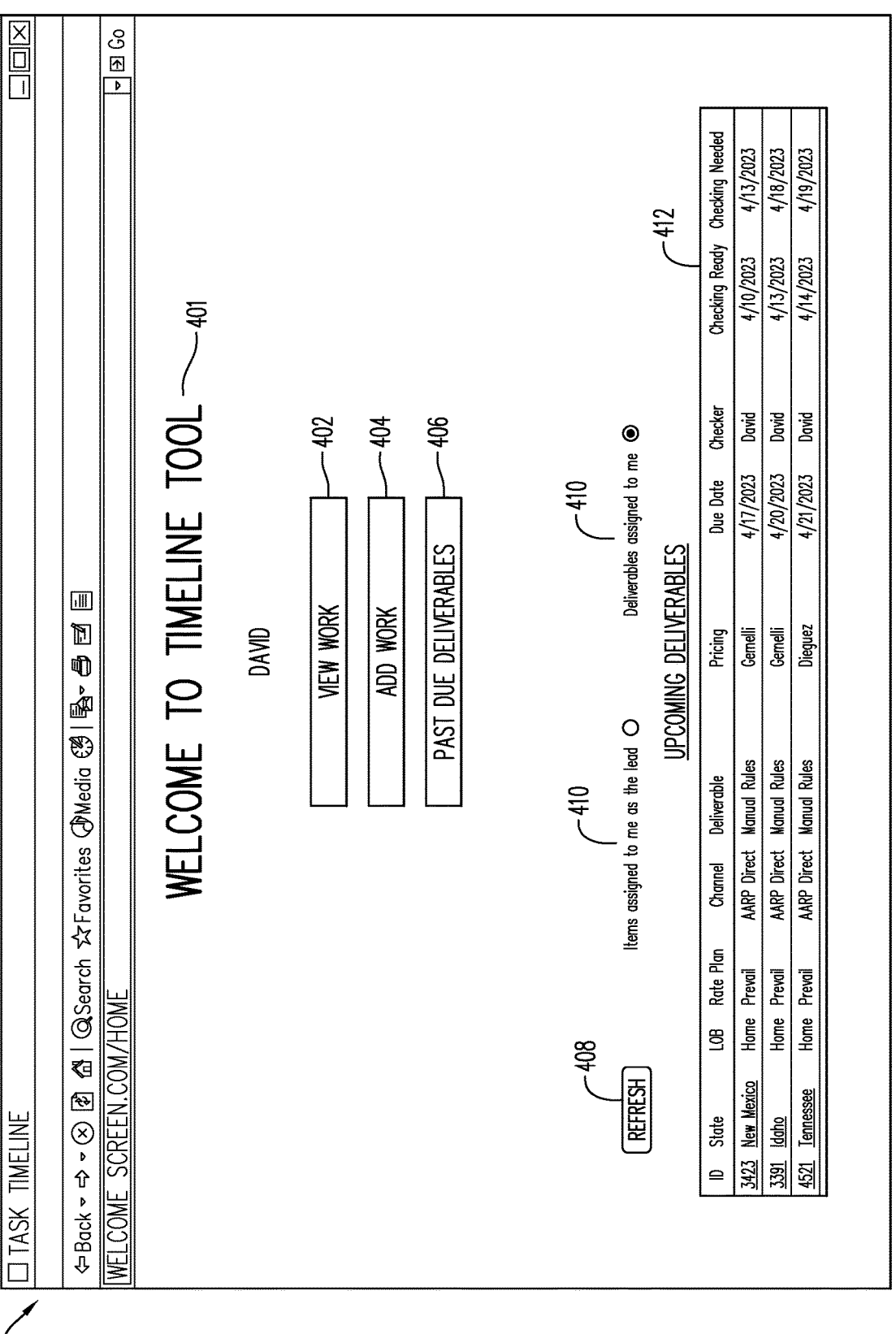
FIG. 4 is an outward view of a graphical user interface of a dashboard according to some embodiments.
Figure 5:
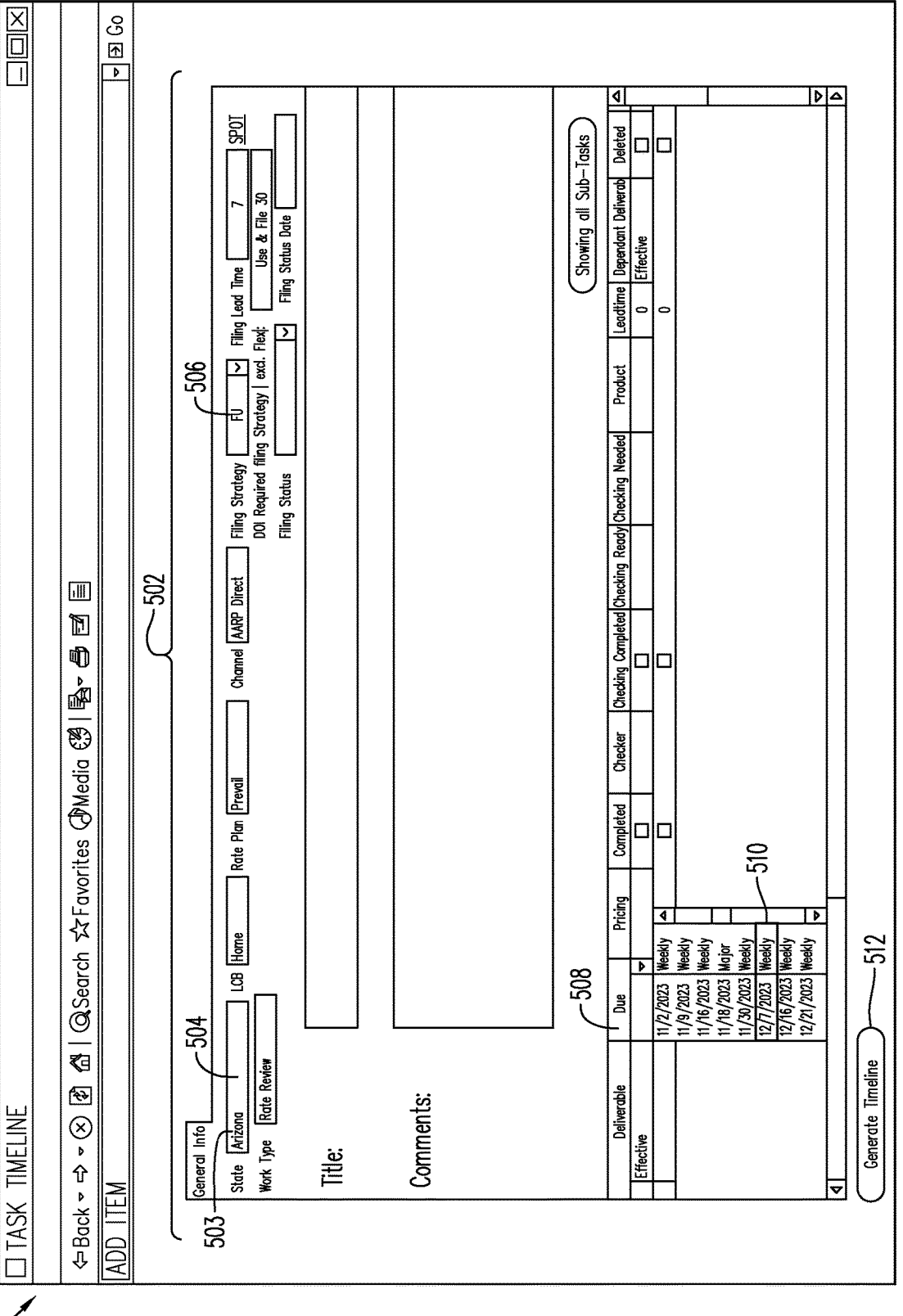
FIG. 5 is an outward view of an add item graphical user interface according to some embodiments.

Additionally, and also prior to the method 300, a user may access the timeline model algorithm tool ("timeline tool") 220 and be provided with a welcome dashboard display 400 in accordance with some embodiments, as described below with respect to FIG. 4. The welcome dashboard display 400 may display all deliverables on work items assigned to an individual user in chronological order.

In addition to a welcome message 401 including the user name, the welcome dashboard display 400 includes navigation icons to search for/view work items 402, add additional work items 404, view past due deliverables 406, and refresh the data 408. As used herein, the terms "task" and "deliverable" may be used interchangeably. Selection of various icons (e.g., via a touchscreen or computer mouse pointer) may result in the display of an appropriate user interface as described in connection with FIGS. 4 through 10B. The welcome dashboard display 400 also includes user-selectable filters 410 (e.g., to select items assigned to the user as the lead, and deliverables assigned to the user.) Additionally, the welcome dashboard display 400 includes a table 412 generated based on selection of the filter 410. In the non-exhaustive example shown herein, the deliverables assigned to the user (David) filter 410 is selected, and the table 412 generated is an "Upcoming Deliverables" table 412. According to some embodiments, selection of the "Refresh" icon 408 may result in the system updating the information that is presented on the welcome dashboard display 400 (e.g., to reflect updated upcoming deliverables in a table 412).

The timeline tool 220 may receive selection of an "add work" icon 404 (FIG. 4), resulting in presentation of an add item user interface display 500 (FIG. 5), according to some embodiments. The timeline tool 220 at the back-end application computer server 202 may receive the selection from a remote user device associated with a first user identifier. This add work display 500 may include a plurality of parameters 502 (e.g., State, LOB (line of business), Rate Plan, Channel, Filing Strategy, Filing Lead Time, DOI Required Filing Strategy, Filing Status, Work Type, Title and Comments, etc.). Each parameter may be linked to a user-entry field 504 or drop-down menu 506. The work type parameter may indicate a workflow 100.

Turning back to the process 300, initially at S310 a workflow 100 is received. The workflow 100 may be received by the user interface. Non-exhaustive examples of workflows include rate review, DOI surveys, introduction of a new class plan, etc. Continuing with the example described above, the workflow is "Rate Review." It is noted that while the work type parameter herein is linked to a user-entry field, in other embodiments, the work type parameter may be linked to a drop-down menu of selectable workflows. Additional data 503 may also be received in the user-entry fields 504 (e.g., State, LOB, Rate Plan, Channel, Filing Strategy, Filing Lead Time, DOI Required Filing Strategy and Filing Status) and drop-down menus 506 at S312. Herein, the additional data 503 for State is "Arizona", LOB is "Home", Rate Plan is "Prevail", Channel is "AARP Direct", Filing Strategy is "FU", Filing Lead Time is "7". In some embodiments, the Filing Strategy may be different for every State, LOB, Rate Plan and Channel. The timeline tool 220 may provide the available Filing Strategies per the drop-down menu based on the state entered in the State user-entry field. Pursuant to some embodiments, a product manager's preferred strategy may also be used to determine the filing strategies provided in the drop-down menu. The timeline tool 220 may also populate/display a minimum requirement for the DOI for the selected states. For example, Arizona is a Use and File state, so "FU" is the only option in the drop-down menu for Filing Strategy. Further, depending on the State and LOB selected, certain effective due dates 508 may not be permitted. In response to this restriction, the timeline tool 220 restricts the effective date 510 list to only those dates that are allowed. It is noted that the order of S310 and S312 may be reversed, whereby the additional data is received prior to receipt of the workflow 100. It is also noted that less than all of the additional data items may be received for adding work. A due date 508 may be received in S314. As shown herein, the due date 508 may be selected from a drop-down menu 510. A "Generate Timeline" icon 512 is selected in S316. Selection of the "Generate Timeline" icon 512 may act as a request 232 that is received by the ingestion engine 218 of the back-end application computer server 202. Pursuant to some embodiments, the back-end application computer server 202 may be a SQL server or any suitable server, and the front-end user interface may be a database management system (e.g., Microsoft Access®). The user interface may allow the user to read live information from the back-end application computer server 202 as well as write data to the back-end application computer server 202. Reporting tools (e.g., Excel®, Tableau®, other) may retrieve data directly from the back-end application computer server 202, irrespective of the reporting tool platform. Timelines may be customizable, and the sequential order may be calculated based on lead time and the deliverable that particular deliverable is dependent on. Pursuant to some embodiments, the timeline 240 including the tasks/deliverables, lead times and dependent deliverables may be populated in the timeline 240 based on one or more tables.

Then, in S318, in response to selection of the "Generate Timeline" icon 512, a plurality of tasks 102 are retrieved. The tasks 102 are associated with the selected workflow 100 and based on the additional received data 503. A benefit provided by embodiments is that the timeline tool 220 analyzes all of the possible combinations of tasks without the user having to remember the tasks and requirements for a given workflow. As a non-exhaustive example, there may be over 2,600 combinations of tasks resulting in over 41,000 workflows, each task with its own lead time, dependency, effort hours and responsible parties.

As a non-exhaustive example, the rate review workflow with West Virginia includes a prior approval of 60 days and the rate review workflow with Iowa does not have a prior approval requirement, but instead is a File and Use 30 day requirement. These different tasks may result in different timelines. As another non-exhaustive example, with determining lead times for a Final IT Pack, the lead times may be affected by: whether a rate review needs a BOB report, the state requires a UM Supplementary Application to be sent to policy holders; a structure change that may need to be programmed by the IT group; a change in territory factors; use of a majority monthly release vs. a minor weekly release; the rate review is for state A vs state B, etc.

The retrieved tasks 102 may be presented on a display 600 in S320. The columns in the display include, but are not limited to, a Deliverable/task (602), a due date (604), pricing, a completed checkbox, a checker, checking completed check box, checking ready, checking needed, product, Leadtime (606) and Dependent Deliverable (608). It is noted that one or more deliverables may include peer review checking. A user (e.g., manager) may pull up all peer review checking items to be able to assign them out based on who has capacity. Some of these tasks may also require the checker to complete a brief survey after completion of the checking to provide feedback about the item (e.g., "Was the item in good order," "Were items found that required the deliverable to be reworked," etc.) These metrics may be collected and aggregated to track quality, as well as to provide feedback to the machine learning model.

Figure 6:
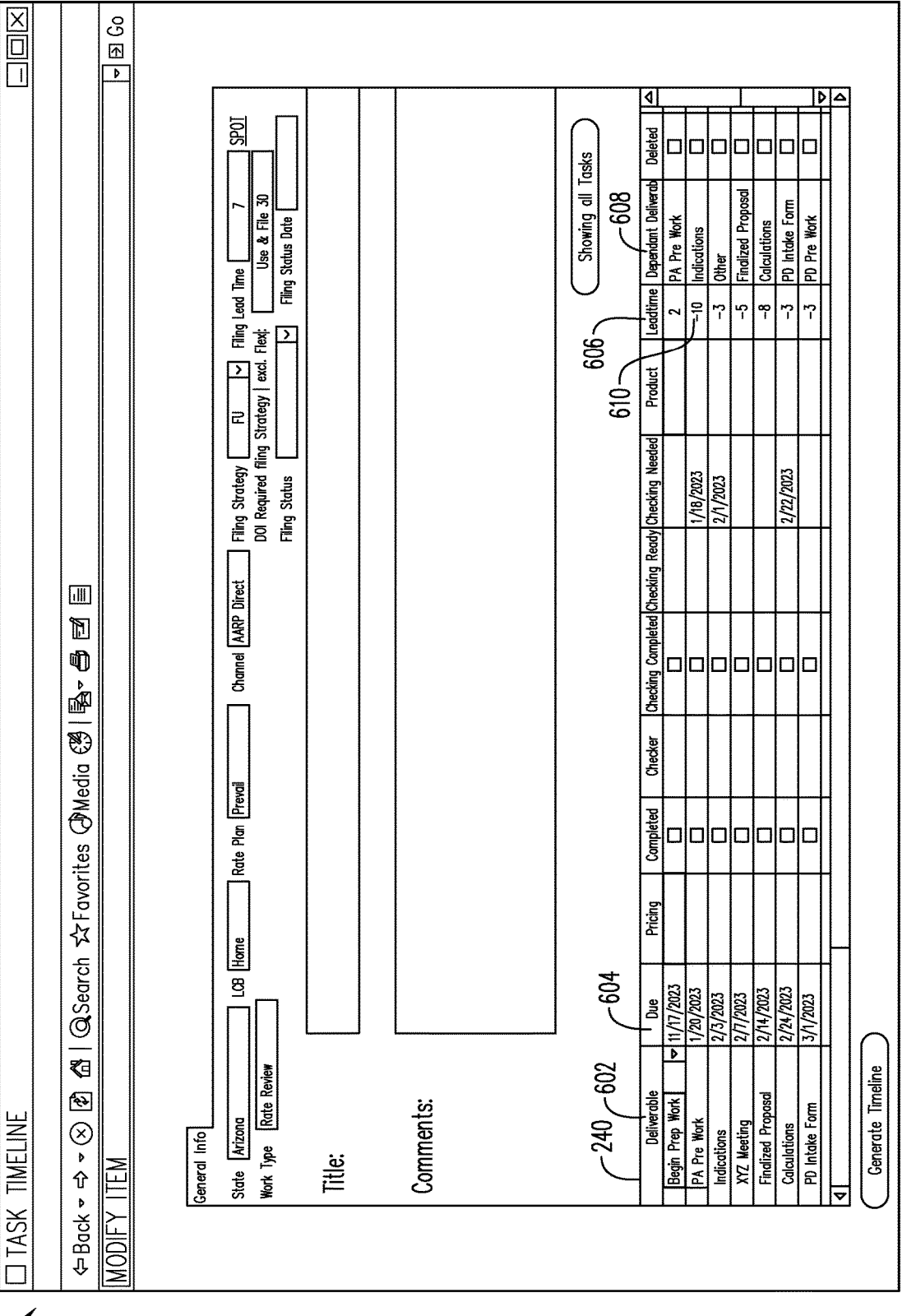
FIG. 6 is an outward view of an add item graphical user interface including data according to some embodiments.

FIG. 6 is an example of a display 600 with the generated timeline 240. The timeline 240 includes a sequentially ordered list of tasks/deliverables per a deliverable column 602 and a due date column 604. The timeline 240 also includes a lead column 606 and a dependent deliverable column 608. As described above, the values 610 in the lead column 606 are generated based on the value 610 in the dependent deliverable column 608. In the example shown herein, the "Begin Prep Work" deliverable has a dependent deliverable of "PA Pre Work". As used herein, "PA" is an abbreviation of "Pricing Analyst" and "PD" is an abbreviation of "Pricing Delivery". The lead time value for this is "2". Since the lead time is a positive number, this is a lag value, meaning there is a two unit (in this case unit is day) delay between the completion of the Begin Prep Work and the initiation of the PA Pre Work. As another example shown herein, the "PA Pre Work" deliverable has a dependent variable of "Indications." The lead time value for this is "−10", meaning that work on the Indications deliverable can be initiated ten days prior to the conclusion of the PA Pre Work deliverable. Identifying the lead time may help plan/re-plan activities so that resources can make the most of that time. The early start of subsequent tasks may reduce the overall time required to complete a sequence of activities (tasks in the workflow).

In some embodiments, certain deliverables require peer review checking, and the timeline tool 220 automatically populates the dates needed for the peer review checking.

Next, each task receives a resource assignment adapted to execute the task in S322. A "resource" may be a machine/process/user/tool, etc. necessary to complete the task. Pursuant to some embodiments, the resource may be selected from a drop-down menu or may be entered in a user-entry field. In the non-exhaustive example shown in FIG. 6, the "Pricing" and "Product" columns may receive resource assignments.

The timeline 240 may be saved in S324. It is noted that the timeline may be automatically saved and/or saved in response to selection of a save icon.

Notifications 241 including the timeline 240 and user assignment are transmitted in S324 to all resources involved with the timeline when new items are added or modified. The notification 241 may be an email, text message, video message, or any other suitable notification. As described further below, and according to some embodiments, the back-end application computer server 202 may transmit information to an email server, workflow application, a chatbot text interface, a streaming video interface, a voice recognition application, or a calendar application 230 (e.g., to generate reminders of deliverable due dates). This information may be used by the system 200, for example, to automatically establish a channel of communication with an employee, automatically transmit a message to a manager, etc.

One of the resources that may receive the transmitted notification 241 and/or timeline 240 is the workflow scheduler tool 260. The workflow scheduler tool 260 may analyze the specific occupancy for each individual and organizational department based on the specific timelines and effort hours assigned to deliverables to configure a schedule to complete the tasks in the workflow. As used herein, "effort hours" may refer to the number of hours, or other unit of time, a resource spends to complete the task. The schedule may be divided by days, hours or other suitable characterization. The role of the schedule is to assign (and/or confirm assignment) the tasks of the workflow according to a variety of criteria including, but not limited to, dependency between tasks, time requirements and resource availability. The workflow scheduler tool 260 may capture data from one or more parties and generate a scheduled execution time for each task in the workflow. The workflow scheduler tool 260 may use historical data and a machine learning model to generate the scheduled execution time for each task in the workflow.

Figure 7:
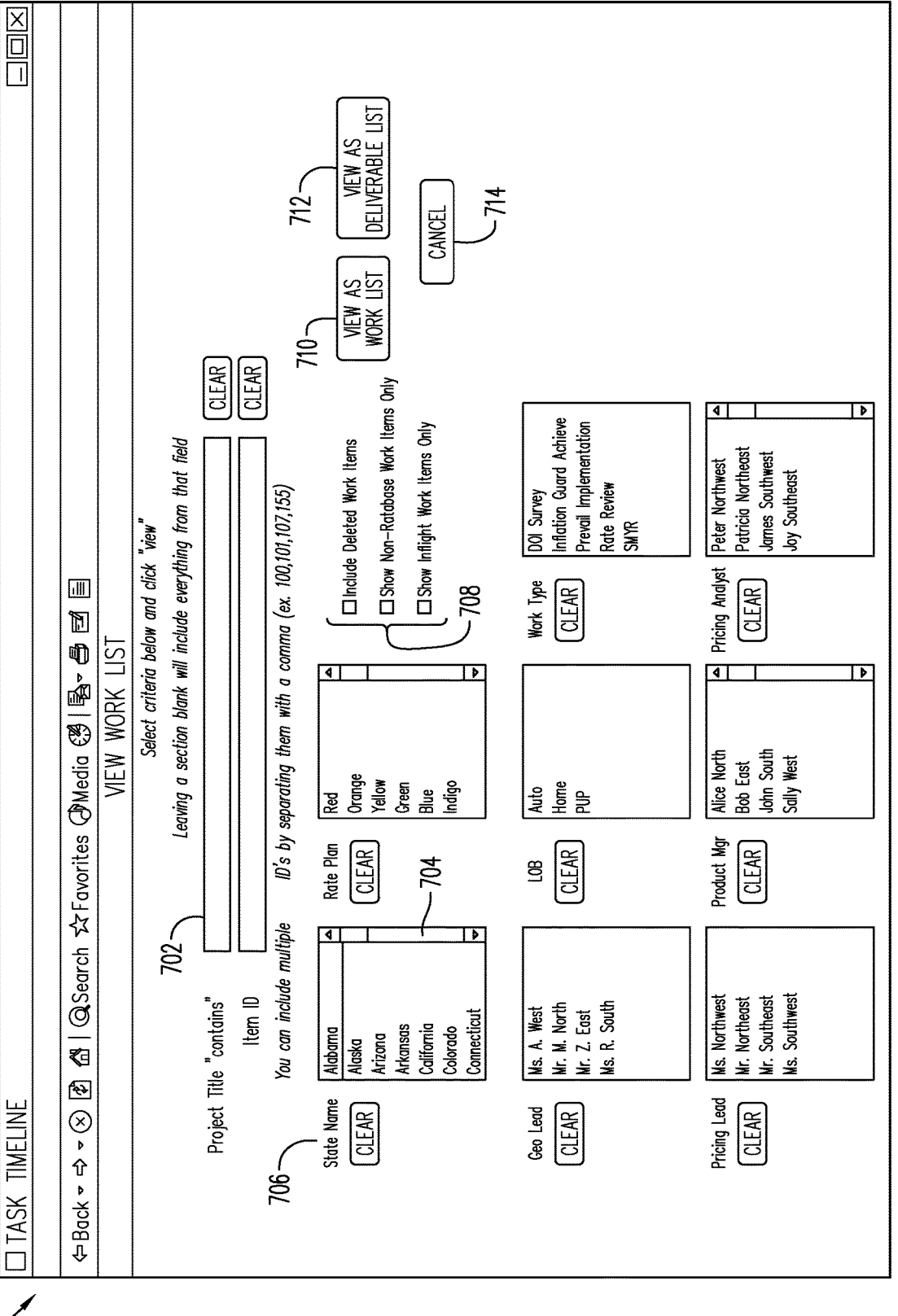
FIG. 7 is an outward view of a searchable worklist on a graphical user interface according to some embodiments.

FIG. 7 is an example of a view work display 700 in accordance with some embodiments. The display 700 may be used by a user to configure a display to view their current timelines. Selection of the "View Work" icon 402 (FIG. 4) may result in presentation of the display illustrated in FIG. 7 according to some embodiments. This display 700 includes a plurality of data entry fields 702 to receive a Project Title and an Item ID. This display 700 also may include a plurality of menus 704 for different criteria 706. The criteria include, but are not limited to, State name, Geographic Lead, Pricing Lead, Rate Plan, LOB, Product Manager, Work Type, and Pricing Analyst. The display 700 may further include a plurality of check-box filters 708 (e.g., include deleted work items, show non-Ratabase work items only, show Inflight Work items only). The display 700 also includes a "View As Work List" icon 710, a "View As Deliverable List" icon 712 and a "Cancel" icon 714.

Selection of the "View As Deliverable List" icon 712 may result in a "Deliverable List" display 800. The display 800 allows the user to see deliverables listed as separate line items, as well as who's assigned to them and the completion status for the deliverable. For example, FIG. 8 is an example of a display 800 where the "View As Deliverable List" icon 712 was selected according to some embodiments. The display 800 includes a table 802. The table 802 includes current work data 804 (e.g., timeline tool identification number, deliverable identification number, region, entity, work type, title, state, LOB, rate plan, channel, deliverable, due date, pricing assignment, deliverable completion status (true or false), a checking due date and a checker). Additionally, the timeline tool identification number may be a link such that selection of the identification number may open that task item and allow the user to see more detail about the task. Selection of the link may also allow the user to edit the task in a case the user has edit permissions.

Figure 9:
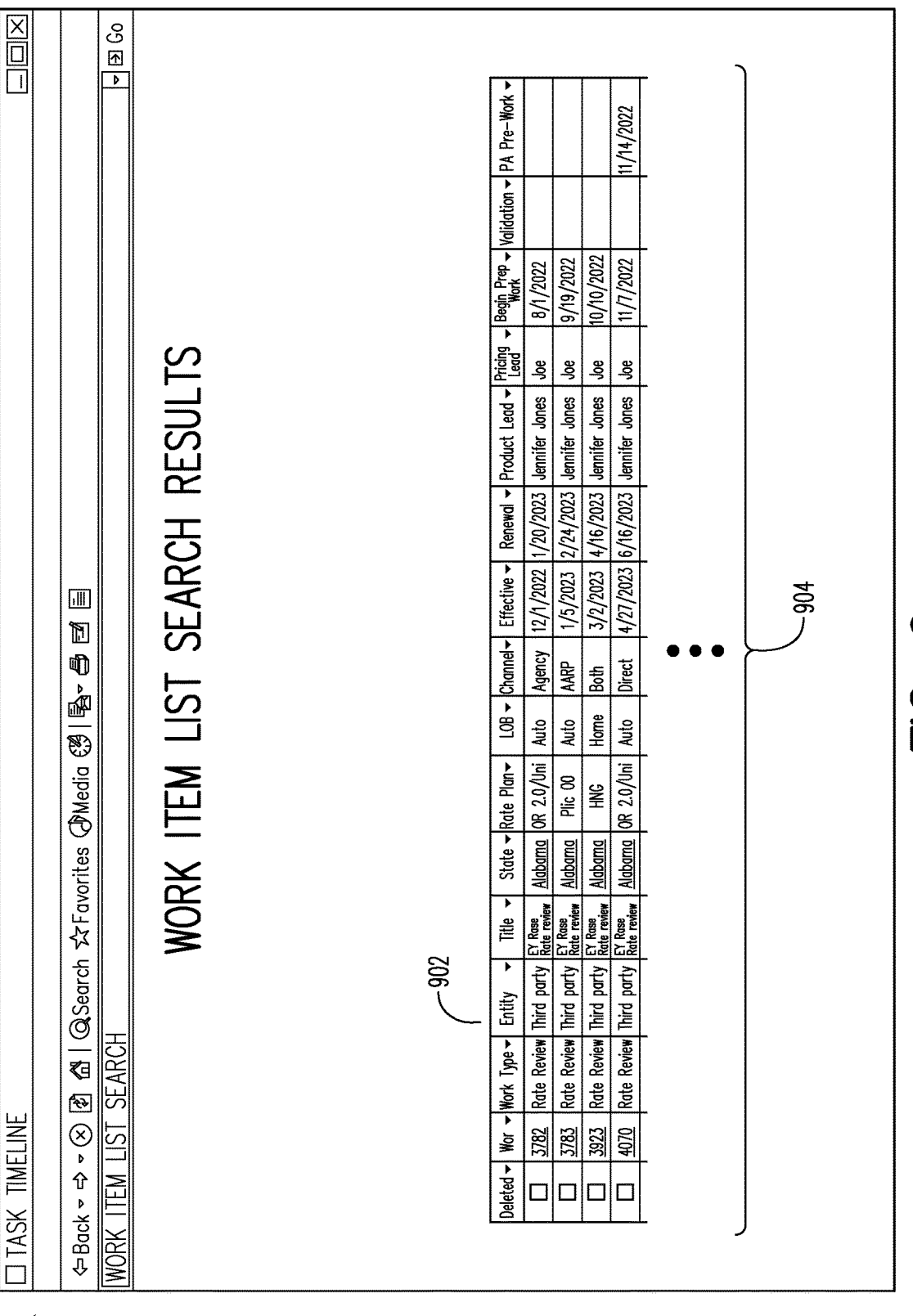
FIG. 9 is an outward view of a work item list search results on a graphical user interface according to some embodiments.

Selection of the "View As Work List" icon 710 may result in a "Work Item List" display 900. The display 900 allows the user to see high level information including deliverable dates. For example, FIG. 9 is an example of a display 900 where the "View As Work List" icon 710 was selected according to some embodiments. The display 900 includes a table 902. The table 902 includes current work data 904 (e.g., a work item deletion check box, deliverable identification number, work type, entity, title, state, rate plan, LOB, channel, effective date, renewal date, product lead, pricing lead, Begin Prep work date, validation, PA pre-work date). A user may use the work list display 900 to view existing deliverables and parameters associated with the deliverable. Additionally, the deliverable identification number and the state may be links such that selection of the identification number and/or state may open that task item and allow the user to see more detail about the task. Selection of the link may also allow the user to edit the task in a case the user has edit permissions.

Figure 10A:
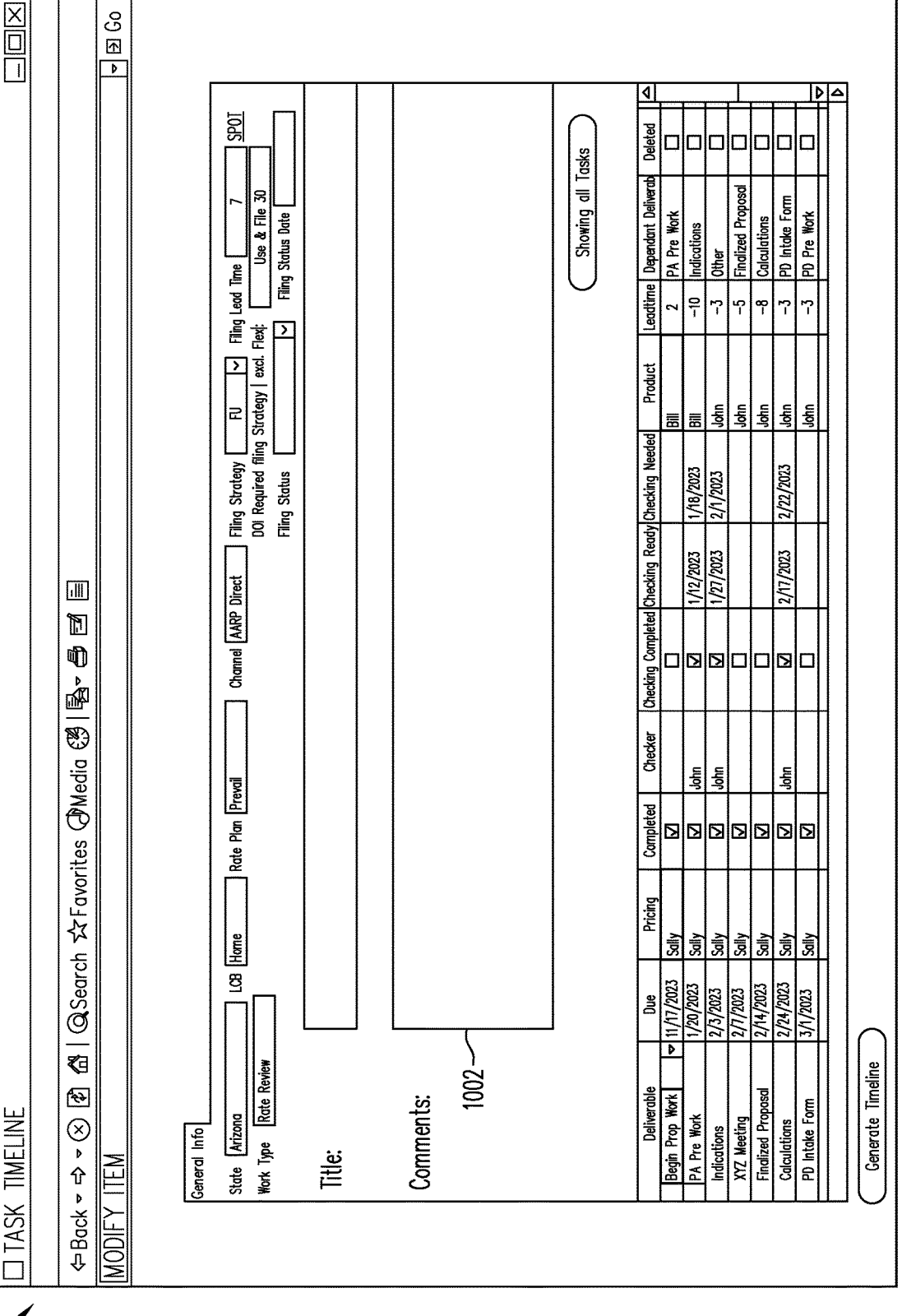
FIG. 10A is an outward view of a modify item graphical user interface including data according to some embodiments.

FIG. 10A is an example of a modify work display 1000 in accordance with some embodiments. The display 1000 may be used by a user (e.g., an employee or manager) to modify a timeline 240. For example, selection of the timeline identification number in the Deliverable List display 800 of FIG. 8 or selection of the identification number and/or state in the Work List display 900 of FIG. 9 may result in the modify work display 1000. The modify work display 1000 allows the user to view more detail for the selected task, as well as edit the task. As a non-exhaustive example, users may add deliverables, delete deliverables, assign work out, recalculate reviews, mark things as complete, add notes, change filing strategies and essentially edit any other aspect of the task. According to some embodiments, when a user marks a DOI Data Call or other item as complete, they may be automatically prompted on whether they want a next annual task created by the timeline tool. This functionality may prevent a user from forgetting to create a next annual entry, as these tasks (and others) may be required to be completed every year to stay in compliance with the DOI. Any edits to the task that changes a due date or assigned individuals may cause recordation of a note in the comments text box 1002. Additionally, any edits to the task that changes a due date or assigned individual may cause the automatic generation and transmission of an email notification, or other suitable notification, to any involved parties to notify them of the change. As described above, the notification may be sent via a communication link 226, email server, workflow, calendar function 230. By automatically sending the notification when a change is made, notification of the changes may be available to other users who might not otherwise be made aware of the changes.

Figure 10B:
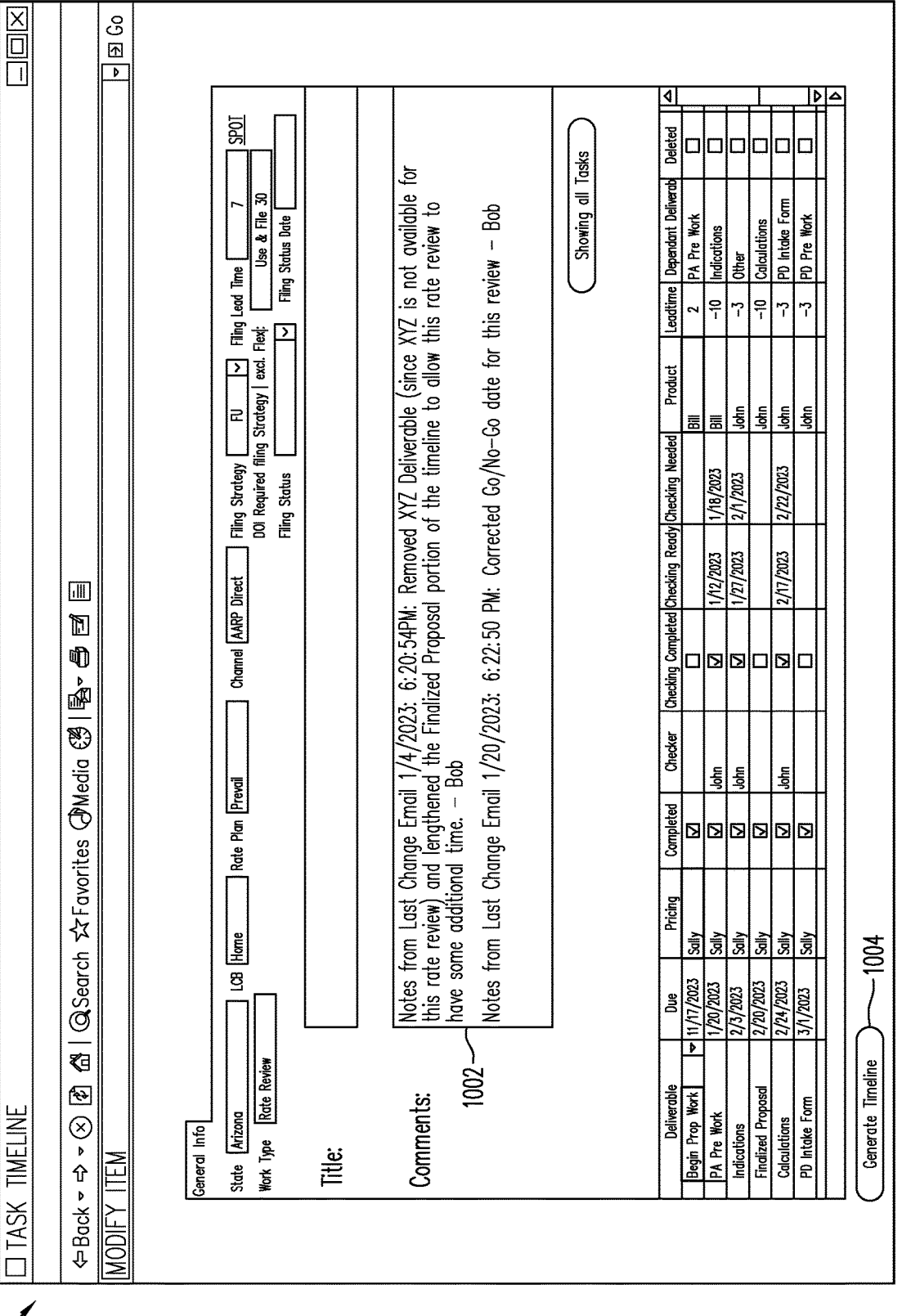
FIG. 10B is an outward view of the user interface in FIG. 10A including modifications according to some embodiments.

Consider for example, the timeline 240 in the display 600 of FIG. 6. When the timeline 240 was initially generated, resources were not yet added to the pricing/product columns, and the tasks had not yet been completed as indicated by the unchecked boxes in the completed columns. Subsequently that timeline 240 was modified/edited, as shown by the modify work display 1000 in FIG. 10A. As can be seen herein, the resources were added to the pricing/product columns and some of the tasks have been completed as indicated by the checks in the completed columns. As described above, during the initial generation of the timeline, the tasks are populated based on tables stored in the task data store 204. However, these initial timelines may be a standard timeline created based on the default values included in the tables. The deliverables in the display 1000 may then be configurable based on user needs. Notes in the comment text box 1002 indicate further modifications. In embodiments, the notes in the comment text box 1002 may be manually added by a user and/or may be automatically populated based on the changes made to the timeline. As a non-exhaustive example, the XYZ deliverable was removed from the timeline 240, as XYZ is not available for this rate review, as shown in FIG. 10B. Additionally, in the same modification, the Finalized proposal portion was lengthened to allow this particular rate review to have additional time. Changing the length of any portion and/or removing a deliverable may cause further modifications to due dates and/or lead times in the timeline. For example, removing the XYZ meeting and lengthening the finalized proposal portion (from Feb. 14, 2023 to Feb. 20, 2023) may result in a change in due dates and a change in the lead time (from −8 for the finalized proposal portion to −10) for the tasks that would have followed these tasks. In some instances, the change may only affect the dependent deliverable, while in other instances more than one downstream deliverable may be affected. In some embodiments, the timeline 240 may be re-generated to reflect the modifications. The re-generation may be executed in response to selection of the "Generate Timeline" icon 1004.

Figure 11:
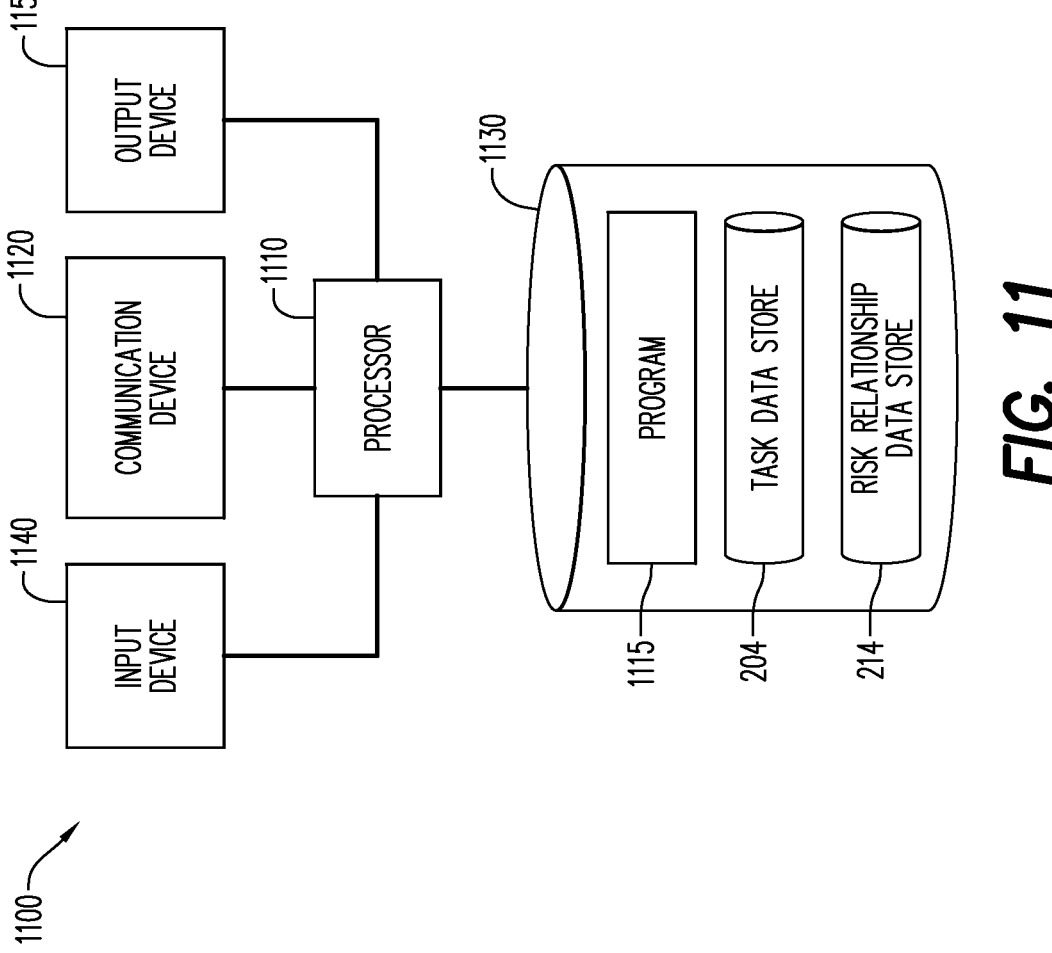
FIG. 11 is a block diagram of an apparatus according to some embodiments.

The embodiments described herein may be implemented using any number of different hardware configurations. For example, FIG. 11 illustrates an apparatus 1100 that may be, for example, associated with the system 200 described with respect to FIG. 2. The apparatus 1100 comprises a processor 1110, such as one or more commercially available Central Processing Units ("CPUs") in the form of one-chip microprocessors, coupled to a communication device 1120 configured to communicate via a communication network (not shown in FIG. 11). The communication device 1120 may be used to communicate, for example, with one or more remote third-party business or economic platforms, administrator computers, insurance agent, and/or communication devices (e.g., PCs and smartphones). Note that communications exchanged via the communication device 1120 may utilize security features, such as those between a public internet user and an internal network of an insurance company and/or an enterprise. The security features might be associated with, for example, web servers, firewalls, and/or PCI infrastructure. The apparatus 1100 further includes an input device 1140 (e.g., a mouse and/or keyboard to enter information about data sources, research data, state data, release dates, etc.) and an output device 1150 (e.g., to output reports regarding schedules, status, alerts, etc.).

The processor 1110 also communicates with a storage device 1130. The storage device 1130 may comprise any appropriate information storage device, including combinations of magnetic storage devices (e.g., a hard disk drive), optical storage devices, mobile telephones, and/or semiconductor memory devices. The storage device 1130 stores a program 1115 and/or an application for controlling the processor 1110. The processor 1110 performs instructions of the program 1115, and thereby operates in accordance with any of the embodiments described herein. For example, the processor 1110 may a receive a request for selection of a workflow and retrieve tasks associated with the workflow. The processor 1110 may then automatically generate a timeline of tasks in the workflow based on the received and retrieved data.

The program 1115 may be stored in a compressed, uncompiled and/or encrypted format. The program 1115 may furthermore include other program elements, such as an operating system, a database management system, and/or device drivers used by the processor 1110 to interface with peripheral devices.

As used herein, information may be "received" by or "transmitted" to, for example: (i) the apparatus 1100 from another device; or (ii) a software application or module within the apparatus 1100 from another software application, module, or any other source.

In some embodiments (such as shown in FIG. 11), the storage device 1130 further includes a task data store 204 and a risk relationship data store 214.

Figure 12:
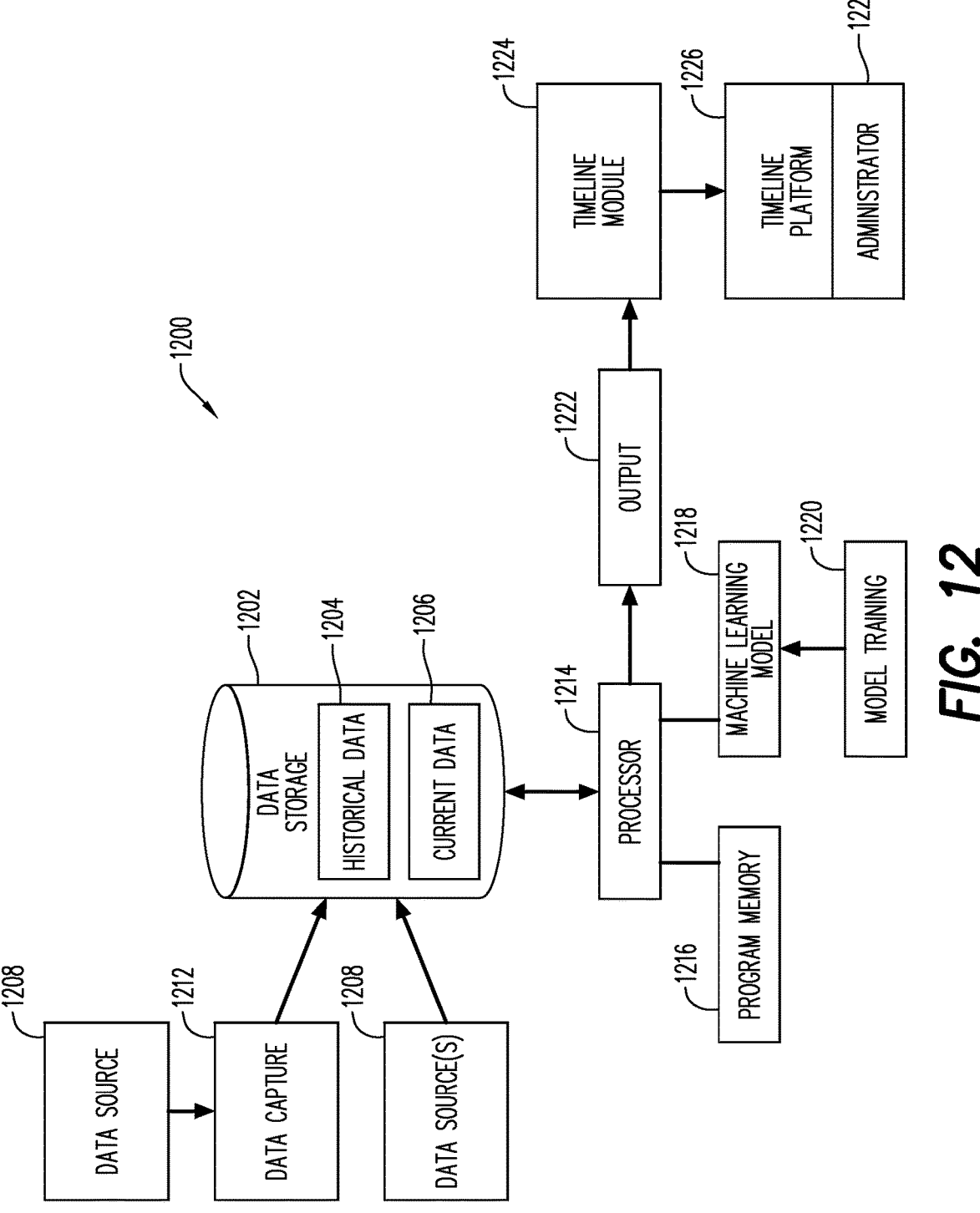
FIG. 12 is a block diagram of a system according to some embodiments.

According to some embodiments, one or more machine learning algorithms and/or predictive models may be used to perform automatic timeline generation, and re-generation. Features of some embodiments associated with a model will now be described by referring to FIG. 12. FIG. 12 is a partially functional block diagram that illustrates aspects of a computer system 1200 provided in accordance with some embodiments of the invention. For present purposes it will be assumed that the computer system 1200 is operated by an insurance company (not separately shown) for the purpose of supporting automated timeline generation for a workflow (e.g., to manage tasks in a workflow). According to some embodiments, the third-party data and/or risk relationship data may also be used to supplement and leverage the computer system 1200.

The computer system 1200 includes a data storage module 1202. In terms of its hardware the data storage module 1202 may be conventional, and may be composed, for example, by one or more magnetic hard disk drives. A function performed by the data storage module 1202 in the computer system 1200 is to receive, store and provide access to both historical data 1204 and current data 1206. As described in more detail below, the historical data 1204 is employed to train a machine learning model to provide an output that indicates an identified performance metric and/or an algorithm to generate a timeline for a workflow, and the current data 1206 is thereafter analyzed by the model. Moreover, as time goes by, and results become known from processing current workflow timelines, at least some of the current decisions may be used to perform further training of the model. Consequently, the model may thereby adapt itself to changing conditions.

Either the historical data 1204 and/or the current data 1206 may include, according to some embodiments, workflow data etc. The data may come from one or more data sources 1208 that are included in the computer system 1200 and are coupled to the data storage module 1202. Non-exhaustive examples of data sources may be the insurance company's policy database (not separately indicated), state DOI databases, etc. It is noted that the data may originate from data sources whereby the data may be extracted from raw files or the like by one or more data capture modules 1212. The data capture module(s) 1212 may be included in the computer system 1200 and coupled directly or indirectly to the data storage module 1202. Examples of the data source(s) 1208 that may be captured by a data capture model 1212 include data storage facilities for big data streams, document images, text files, and web pages (e.g., DOI webpages). Examples of the data capture module(s) 1212 may include one or more optical character readers, a speech recognition device (i.e., speech-to-text conversion), a computer or computers programmed to perform NLP, a computer or computers programmed to identify and extract information from images or video, a computer or computers programmed to detect key words in text files, and a computer or computers programmed to detect indeterminate data regarding an employee such as a questionnaire response, etc.

The computer system 1200 also may include a computer processor 1214. The computer processor 1214 may include one or more conventional microprocessors and may operate to execute programmed instructions to provide functionality as described herein. Among other functions, the computer processor 1214 may store and retrieve historical insurance data and timelines 1204 and current data 1206 in and from the data storage module 1202. Thus, the computer processor 1214 may be coupled to the data storage module 1202.

The computer system 1200 may further include a program memory 1216 that is coupled to the computer processor 1214. The program memory 1216 may include one or more fixed storage devices, such as one or more hard disk drives, and one or more volatile storage devices, such as RAM devices. The program memory 1216 may be at least partially integrated with the data storage module 1202. The program memory 1216 may store one or more application programs, an operating system, device drivers, etc., all of which may contain program instruction steps for execution by the computer processor 1214.

The computer system 1200 further includes a machine learning model component 1218. In certain practical embodiments of the computer system 1200, the machine learning model component 1218 may effectively be implemented via the computer processor 1214, one or more application programs stored in the program memory 1216, and computer stored as a result of training operations based on the historical data 1204 (and possibly also data received from a third party). In some embodiments, data arising from model training may be stored in the data storage module 1202, or in a separate computer store (not separately shown). A function of the machine learning model component 1218 may be to generate a timeline for tasks in a workflow, etc. The machine learning model component may be directly or indirectly coupled to the data storage module 1202.

The machine learning model component 1218 may operate generally in accordance with conventional principles for machine learning models, except, as noted herein, for at least some of the types of data to which the machine learning model component is applied. Those who are skilled in the art are generally familiar with programming of predictive/machine learning models. It is within the abilities of those who are skilled in the art, if guided by the teachings of this disclosure, to program a predictive/machine learning model to operate as described herein.

Still further, the computer system 1200 includes a model training component 1220. The model training component 1220 may be coupled to the computer processor 1214 (directly or indirectly) and may have the function of training the machine learning model component 1218 based on the historical data 1204 and/or information about entities. (As will be understood from previous discussion, the model training component 1220 may further train the machine learning model component 1218 as further relevant data becomes available.) The model training component 1220 may be embodied at least in part by the computer processor 1214 and one or more application programs stored in the program memory 1216. Thus, the training of the machine learning model component 1218 by the model training component 1220 may occur in accordance with program instructions stored in the program memory 1216 and executed by the computer processor 1214.

In addition, the computer system 1200 may include an output device 1222. The output device 1222 may be coupled to the computer processor 1214. A function of the output device 1222 may be to provide an output that is indicative of (as determined by the trained machine learning model component 1218) particular timelines for a workflow, etc. The output may be generated by the computer processor 1214 in accordance with program instructions stored in the program memory 1216 and executed by the computer processor 1214. More specifically, the output may be generated by the computer processor 1214 in response to applying the data for the current simulation to the trained machine learning model component 1218. The output may, for example, be a defined timeline including a sequence of tasks in a workflow including dependent tasks to be completed by particular resources, date/times, automatically generated alerts, etc. In some embodiments, the output device may be implemented by a suitable program or program module executed by the computer processor 1214 in response to operation of the machine learning model component 1218.

Still further, the computer system 1200 may include a timeline module 1224. The timeline module 1224 may be implemented in some embodiments by a software module executed by the computer processor 1214. The timeline module 1224 may have the function of rendering a portion of the display on the output device 1222. Thus, timeline module 1224 may be coupled, at least functionally, to the output device 1222. In some embodiments, for example, the timeline module 1224 may direct communications with an enterprise by referring to an administrator/project leader

1228 via a timeline platform 1226, messages customized and/or generated by the machine learning model component 1218 (e.g., indicating modifications for timelines, alerts or appropriate actions, re-generating timelines etc.) and found to be associated with various parties or types of parties.

Figure 13:
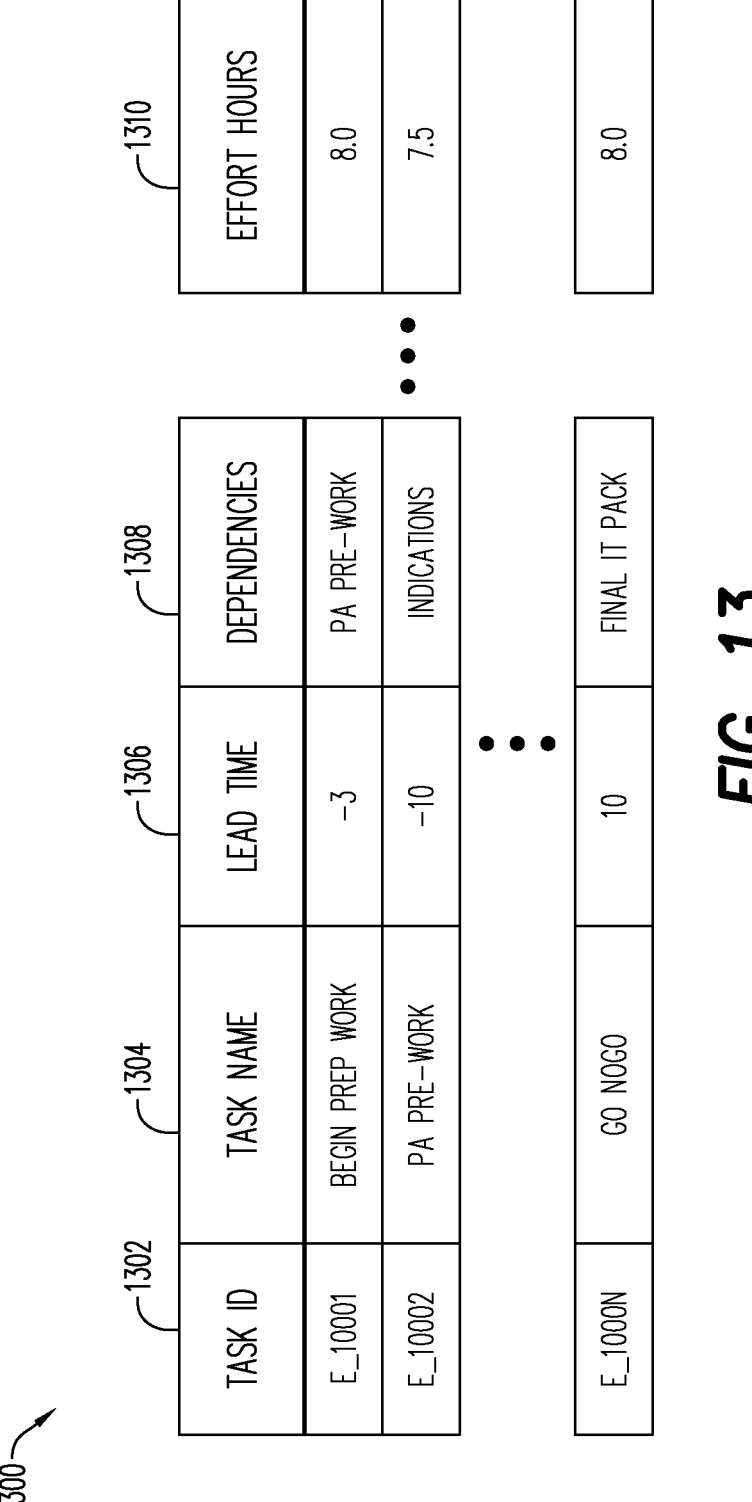
FIG. 13 is a portion of a tabular timeline database according to some embodiments.

Referring to FIG. 13, a table is shown that represents the task database 1300 that may be stored at the apparatus 1100 according to some embodiments. The table may include, for example, entries associated with the workflows. The table may also define fields 1302, 1304, 1306, 1308 and 1310 for each of the entries. The fields 1302, 1304, 1306, 1308 and 1310 may, according to some embodiments, specify: a task ID 1302, a task name 1304, a lead time 1306, dependencies 1308, and effort hours 1310. The timeline database 1300 may be created and updated, for example, based on information electrically received from various computer systems, including those associated with remote employee terminals.

The task ID 1302 may be, for example, a unique alphanumeric code identifying a task associated with a given workflow. The task name 1304 may be the name associated with that task ID. The lead time 1306 may be the time the task can be started before a previous task has completed based on the dependent task 1308. The effort hours 1310 may indicate the amount of time a resource spends to complete the task.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

Figure 14:
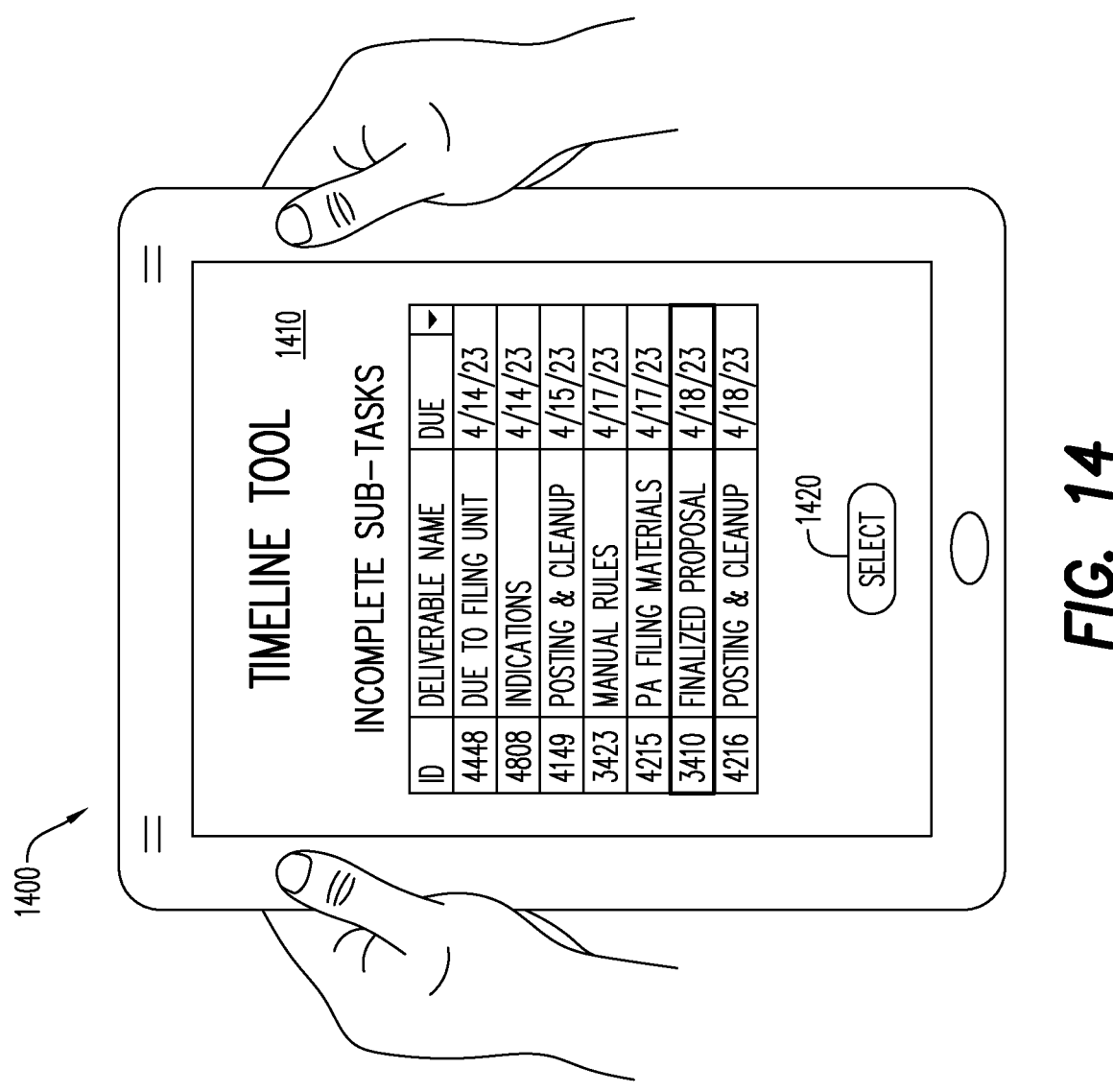
FIG. 14 illustrates a tablet computer displaying a timeline of incomplete task display user interface according to some embodiments.

Although specific hardware and data configurations have been described herein, note that any number of other configurations may be provided in accordance with embodiments of the present invention (e.g., some of the information associated with the displays described herein may be implemented as a virtual or augmented reality display and/or the database described herein may be combined or stored in external systems.) moreover, although embodiments have been described with respect to particular types of enterprises (e.g., an insurance company), embodiments may instead be associated with other types of businesses in addition to and/or instead of those described herein (e.g., financial institutions, universities, governmental departments, etc.). Similarly, although certain attributes were described in connection with some embodiments herein, other types of attributes may be used instead. Sill further, the displays and devices illustrated herein are only provided as examples and embodiments may be associated with any other types of user interfaces. For example, FIG. 14 illustrates a handheld tablet computer 1400 showing a Past Due Deliverables display 1410 according to some embodiments. The Past Due Deliverables display 1410 may include tasks that can be selected and/or modified by a user of the handheld computer 1400 (e.g., via a "Select" icon 1420) to open the item to see more details and edit the work. The Past Due Deliverables display 1410 may allow a user to see which deliverables are not marked complete yet but may be past due. This may help managers and other users focus on critical deliverables. Pursuant to some embodiments, the past due deliverables may be included on the welcome dashboard display 400 (FIG. 4) and highlighted (e.g., highlighted in red) (not shown) or otherwise marked to indicate the past due status of the item.

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

What is claimed is:

1. A system implemented via a back-end application computer server of an enterprise, comprising:
   (a) a task data store containing a plurality of tasks as part of a workflow;
   (b) the back-end application computer server, coupled to the task data store, including:
   a computer processor;
   a computer memory coupled to the computer processor and storing instructions that, when executed by the computer processor, cause the back-end application computer server to:
   train a machine learning model with historical task completion data and workflow data;
   receive a workflow;
   retrieve a plurality of tasks associated with the received workflow;
   retrieve, from an external location-based system, at least one location-based requirement for a first task of the plurality of tasks associated with the received workflow, wherein the location-based requirement is at least one of a release policy and a task requirement;
   generate, via the trained machine learning model, a timeline for execution of each task including for at least one task a lead time and a dependent task, wherein the lead time is an overlap between a first task and a second task and the second task starts before the first task finishes and the second task is dependent upon the first task;
   receive a user assignment for each task; and
   transmit the timeline and the user assignment to a workflow scheduler, the assigned user, and the trained machine learning model as feedback;
   retrain the machine learning model with the transmitted timeline and the user assignment to the workflow;
   receive a modification to at least one task of the received workflow;
   re-generate, via the trained machine learning model, the timeline in response to the modification to the transmitted timeline as determined by the workflow scheduler;
   transmit the re-generated timeline to the workflow scheduler;
   automatically generate, by the trained machine learning model, an alert and a message including the modification and indicating the re-generated timeline; and
   transmit the generated alert and the generated message indicating the re-generated timeline to a plurality of parties via at least one of an email, a text message, and a video message;
   and
   (c) a communication port coupled to the back-end application computer server to facilitate an exchange of data with a remote device to support interactive user interface displays that provide information about the timeline.

2. The system of claim 1, wherein receipt of the task includes receipt of a task type, a task due date, and a task location.

3. The system of claim 2, wherein the task location is at least one state in the United States of America.

4. The system of claim 2, wherein the lead time is indicative of an amount of time prior to the task due date.

5. The system of claim 1, further comprising instructions that cause the back-end application computer server to:
   determine upcoming tasks; and
   display the determined upcoming tasks in chronological order.

6. The system of claim 1, wherein the modification is received from one of the workflow scheduler and a remote user device.

7. The system of claim 1, wherein the back-end application computer server is further programmed to support a dashboard display in accordance with at least one dashboard selection.

8. The system of claim 7, wherein the dashboard display comprises a task list and for each task at least one of: (i) a lead time, (ii) a dependency, (iii) a responsible party, and (iv) a completed task indicator.

9. The system of claim 1, wherein the task is associated with one of an automobile product and a home product.

10. A method implemented via a back-end application computer server of an enterprise, comprising:
   training a machine learning model with historical task completion data and workflow data;
   receiving a workflow;
   retrieving a plurality of tasks associated with the received workflow;
   retrieving, from an external location-based system, at least one location-based requirement for a first task of the plurality of tasks associated with the received workflow, wherein the location-based requirement is at least one of a release policy and a task requirement;

generating, via the trained machine learning model, a timeline for execution of each task, including for at least one task a lead time and a dependent task, wherein the lead time is an overlap between a first task and a second task, and the second task starts before the first task finishes;

receiving a user assignment for each task;

transmitting the timeline and the user assignment to a workflow scheduler, the assigned user, and the trained machine learning model as feedback;

retraining the machine learning model with the transmitted timeline and the user assignment to the workflow;

receiving a modification to at least one task of the received workflow;

re-generating, via the trained machine learning model, the timeline in response to the modification to the transmitted timeline as determined by the workflow scheduler;

transmitting the re-generated timeline to the workflow scheduler;

automatically generating, by the trained machine learning model, an alert and a message including the modification and indicating the re-generated timeline; and transmitting the generated alert and the generated message indicating the re-generated timeline to a plurality of parties via at least one of an email, a text message, and a video message.

11. The method of claim 10 wherein receipt of the task includes receipt of a task type, a task due date, and a task location.

12. The method of claim 10, wherein the lead time is indicative of an amount of time prior to the task due date.

13. The method of claim 10, wherein the modification is received from one of a workflow scheduler and a remote user device.

14. A non-transitory, computer-readable medium storing instructions that, when executed by a processor, cause the processor to perform a method implemented via a back-end application computer server of an enterprise, the method comprising:

training a machine learning model with historical task completion data and workflow data;

receiving a workflow;

retrieving a plurality of tasks associated with the received task;

retrieving, from an external location-based system, at least one location-based requirement for a first task of the plurality of tasks associated with the received workflow, wherein the location-based requirement is at least one of a release policy and a task requirement;

generating, via the trained machine learning model, a timeline for execution of each task, including for at least one task a lead time and a dependent task, wherein the lead time is an overlap between a first task and a second task, and the second task starts before the first task finishes;

receiving a user assignment for each task;

transmitting the timeline and the user assignment to a workflow scheduler, the assigned user, and the trained machine learning model as feedback;

retraining the machine learning model with the transmitted timeline and the user assignment to the workflow;

receiving a modification to at least one task of the received workflow;

re-generating, via the trained machine learning model, the timeline in response to the modification to the transmitted timeline as determined by the workflow scheduler;

transmitting the re-generated timeline to the workflow scheduler;

automatically generating, by the trained machine learning model, an alert and a message including the modification and indicating the re-generated timeline; and transmitting the generated alert and the generated message indicating the re- generated timeline to a plurality of parties via at least one of an email, a text message, and a video message.

15. The medium of claim 14, the lead time is indicative of an amount of time prior to the task due date.

16. The medium of claim 14, wherein receipt of the task includes receipt of a task type, a task due date, and a task location.

17. The medium of claim 14, further comprising:

determining upcoming tasks; and displaying the determined upcoming tasks in chronological order.

* * * * *